O. B. FRAZIER.
LAWN MOWER.
APPLICATION FILED AUG. 21, 1916.

1,256,008.

Patented Feb. 12, 1918.

INVENTOR
OLIVER B. FRAZIER

BY
Lockwood & Lockwood
ATTORNEYS

UNITED STATES PATENT OFFICE.

OLIVER B. FRAZIER, OF ELWOOD, INDIANA.

LAWN-MOWER.

1,256,008.　　　　Specification of Letters Patent.　　Patented Feb. 12, 1918.

Application filed August 21, 1916.　Serial No. 116,143.

*To all whom it may concern:*

Be it known that I, OLIVER B. FRAZIER, a citizen of the United States, and a resident of Elwood, county of Madison, and State of Indiana, have invented a certain new and useful Lawn-Mower; and I do hereby declare that the following is a full, clear, and exact description thereof, reference being had to the accompanying drawings, in which like letters refer to like parts.

The object of this invention is to provide a means for yieldingly adjusting the cutter bar of a lawn mower to the cutting reel so that when adjusted to the cutting reel, it may be yieldingly held to the reel in the proper cutting position. This is accomplished by means of pivotal arms secured at both ends of the cutter bar and adjusted by means of set screws operating on one side of said arms and by yielding means or springs pressing against the other side thereof. This enables an easy and perfect adjustment of the cutter without the necessity of using a screw driver or other tool and renders the adjustment easily accessible. The advantage of this construction is that it obviates an upper cross bar which, in wet grass, catches and clogs the machine. Another feature of the invention is in having the adjustable arms secured on each end of the cutter bar which enables the ends of the cutter to be differently adjusted according to their wear.

Figure 1:
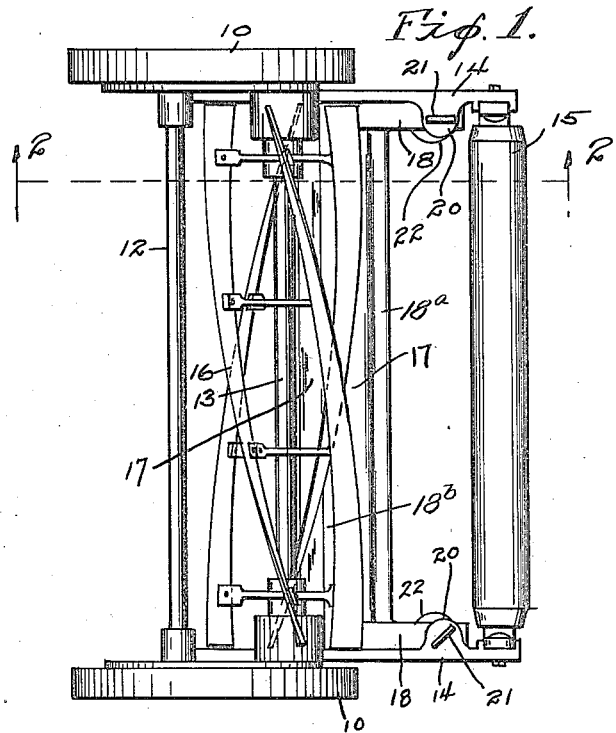
Figure 2:
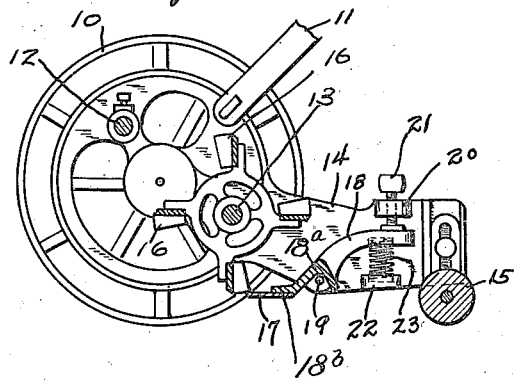

The full nature of the invention will be understood from the accompanying drawings and the following description and claims:

In the drawings, Figure 1 is a plan view of a lawn mower with this improvement. Fig. 2 is a cross section on the line 2—2 of Fig. 1.

In the drawings there is shown a lawn mower having wheels 10, a handle 11, a cross rod 12 and cutting reel 13. The construction of the lawn mower herein described is of the ordinary type in common use. It is, therefore, deemed unnecessary to go into the specific construction of the parts thereof.

Extending rearwardly from the axle there are frames 14 having a roller 15 extending between their ends so that said frames ride on the wheels 10 and the roller 15. The cutting reel 13, having blades 16, rides on bearings in said frames substantially half way between the axle and the roller, said cutting reel being actuated by the wheels 10 in the usual manner.

There is a cutter bar 17 secured at each end to the arms 18 which are pivoted at the point 19 to the frames 14. Said arms extend upwardly and rearwardly from the cutter bar which lies adjacent the cutting reel. The arms 18 are secured together at their forward ends by means of an integral cross frame 18ª which is substantially inverted V-shaped in cross section, the forward inclined section having an integral horizontally disposed plate 18ᵇ against which the cutter bar 17 rests. By forming the cross frame in this manner the pivot 19 may consist of a rod which extends the full width of the machine, the frame preventing grass or weeds or the like from gathering or hanging on the pivot rod, as said rod is positioned on the underside and substantially at the apex of the frame.

There are inwardly extending lugs 20 on the upper portion of the side frames 14 through which set screws 21 are adapted to screw so that their lower ends engage and bear downwardly against the upper sides of the outer ends of said arms so that the outer ends of said arms may be forced downwardly by said set screws so that the cutter bar may be adjustably forced upwardly against the knives of the cutting reel. At the bottom of said side frames there are inwardly extending lugs 22 which have sockets in which spiral springs 23 rest. The other ends of said springs extend into the sockets on the lower side of the arms 18 whereby said arms will be yieldingly forced against the set screws 21.

Therefore, it will be seen that by using an arm extending from each end of the cutter bar having a spring forcing the arm in one direction so as to loosen the cutter and a set screw acting on the arm in the opposite direction for tightening the cutter and holding it to the cutting reel, either end of the cutter may be readily and perfectly adjusted thereto.

The invention claimed is:

A lawn mower including a cutting reel, side frames, an inverted V-shaped cross frame having an integral horizontally disposed plate at one edge, means for pivoting said cross frame to the side frames, upwardly and rearwardly curved arms having one end integral with the ends of said cross frame, the under faces of said arms having sockets therein, a cutter bar attached to said arms and resting against the horizontally disposed plate of the cross frame, inwardly extending projections at the bottom of said frames between which and the upper lug the free ends of said arms project, the upper faces of said projections having sockets in alinement with the sockets of said arms, set screws adapted to screw through said lugs and engage the upper faces of said arms for forcing them downwardly and the cutter bar upwardly against the cutting reel and spiral springs between said projections and the underside of said arms for continuously forcing said arms upwardly and against said set screw, the ends of said springs entering said alining sockets.

In witness whereof, I have hereunto affixed my signature.

OLIVER B. FRAZIER.